Figure 1:
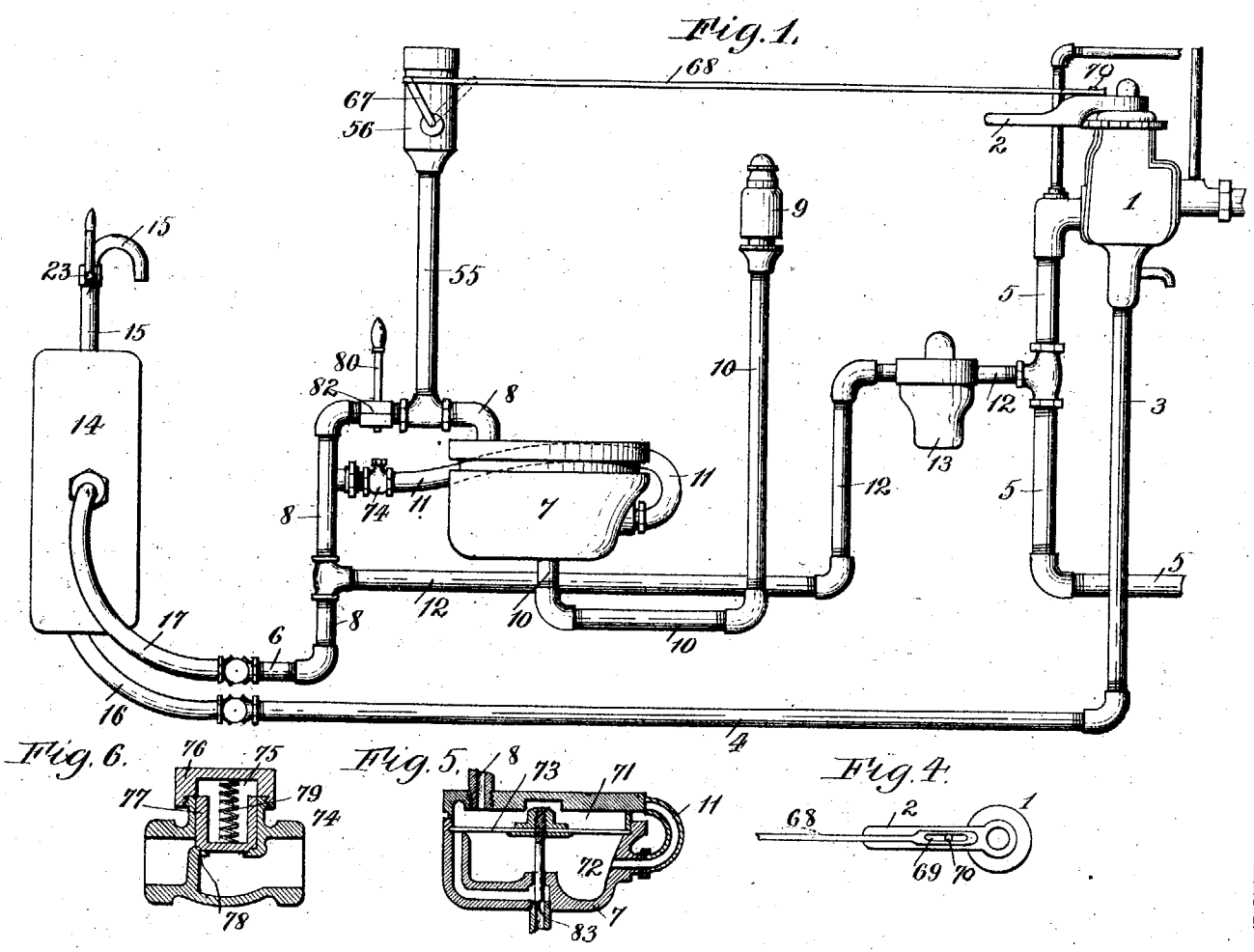

No. 12,158. REISSUED SEPT. 22, 1903.

T. J. QUIRK.

AIR BRAKE MECHANISM.

APPLICATION FILED JUNE 22, 1903.

2 SHEETS—SHEET 1.

Witnesses,
C. M. Bentley
E. A. Volk.

Inventor,
Thomas J. Quirk.
by
Wilhelm & Bonner, Attorneys.

No. 12,158 REISSUED SEPT. 22, 1903.

T. J. QUIRK.

AIR BRAKE MECHANISM.

APPLICATION FILED JUNE 22, 1903.

2 SHEETS—SHEET 2.

Witnesses,
C. M. Bentley
E. A. Vock.

Inventor,
Thomas J. Quirk,
By
Wilhelm & Bonner, Attorneys.

No. 12,158. Reissued September 22, 1903.

UNITED STATES PATENT OFFICE.

THOMAS J. QUIRK, OF BUFFALO, NEW YORK.

AIR-BRAKE MECHANISM.

SPECIFICATION forming part of Reissued Letters Patent No. 12,158, dated September 22, 1903.

Original No. 726,459, dated April 28, 1903. Application for reissue filed June 22, 1903. Serial No. 162,502.

*To all whom it may concern:*

Be it known that I, THOMAS J. QUIRK, a citizen of the United States, residing at Buffalo, in the county of Erie and State of New York, have invented certain new and useful Improvements in Air-Brake Mechanism; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in automatic air-brakes, and more particularly to certain novel attachments which act in conjunction with the air-brakes proper to overcome certain defects in the present system which are a fruitful cause of accidents. As at present constructed and operated should obstructions in the brake-pipe occur from any cause whatever the service is necessarily destroyed and the brakes cannot be set by the engineer. Again, should the supply of air under pressure in the brake-pipe be reduced below an effective point through failure of the pump to work or by accidental shutting off of the air-supply through wrong position of either of the engineer's-brake-valve handle or any of the angle-cocks the effectiveness of the present brake system would again be destroyed.

The object of the present invention is to provide for the contingencies above outlined by producing a practically perfect system which will be equal to any emergency which may arise. This object is attained through the instrumentality, first, of an automatic device adapted for removable engagement with the brake and signal pipes at the rear of the train by means of which the two pipes are so connected with each other that the pressure in the signal-pipe will be automatically utilized to set the brakes in the event of failure of the brake-pipe to properly perform its functions and in case it is necessary to set the brakes while the trouble exists in the brake-pipe to automatically bleed the brake-pipe to set the brakes after emptying the signal-pipe by hand; second, of an improved attachment in operative engagement with the signal-pipe and the engineer's-brake-valve handle by means of which the automatic operation of the device outlined above is prevented during the ordinary braking of the train by the engineer and without interference with the functions of the signal system; third, of certain other improved details of construction, all of which will be more fully hereinafter described, and pointed out in the claims.

Figure 2:
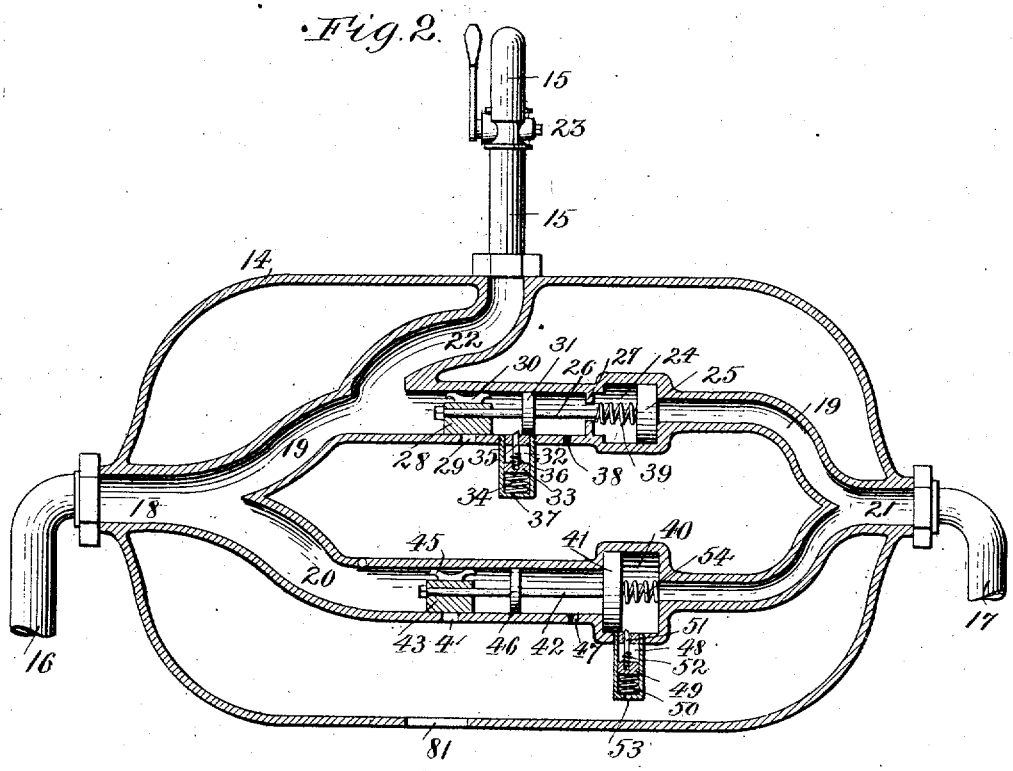
Figure 7:
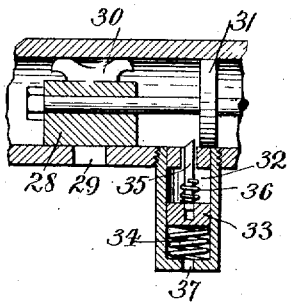
Figure 3:
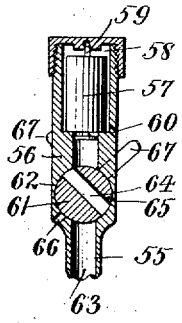
Figure 8:
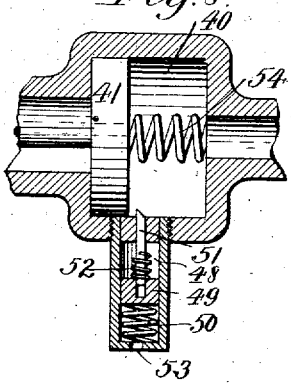

In the accompanying drawings, consisting of two sheets, Figure 1 is a diagrammatic view showing a portion of an automatic air-brake system provided with mechanism embodying the invention. Fig. 2 is a detail view, in vertical section, of my improved automatic device which connects the brake and signal pipes at the rear of the train. Fig. 3 is a detail view, in central vertical section, of an improved regulating-valve. Fig. 4 is a top plan view of the connection with the engineer's brake-valve. Fig. 5 is a central vertical section of the signal-valve. Fig. 6 is a similar section of a regulating-valve in the pipe connecting the lower chamber of the signal-valve with the signal-pipe. Figs. 7 and 8 are sectional views, on an enlarged scale, showing the locking devices for the two automatic valves.

Referring to the drawings, the parts of the present automatic air-brake to which my improvements are applied are shown in Fig. 1 in diagrammatic form, as follows: 1 is the engineer's brake-valve, and 2 is the operating-handle. 3 and 4 are the vertical and horizontal brake-pipes for holding air at pressure of seventy pounds and upward and leading from the valve 1 to the rear of the train. 5 is the pipe leading from the valve 1 to the main reservoir. (Not shown.) 6 is the signal-pipe, leading from the cab to the rear of the train. 7 is the signal-valve, connected to the signal-pipe 6 by the piping 8. 9 is the whistle, connected to the signal-valve 7 through piping 10. 11 is a pipe connecting the lower chamber of the signal-valve 7 with the pipe 8. The system of piping 12 connects the signal-pipe 6 through pipe 8 with pipe 5, leading to the main reservoir. In this pipe 12 is the reducing-valve 13 to reduce the pressure in the signal-pipes 6 and 8 to forty-five pounds.

My improved automatic device, located at the rear of the train, is inclosed in a casing 14. This casing is provided on its upper side with the hook 15, adapted for engagement with the rail of the platform at the rear of the train in order to temporarily suspend such device when in use. The two sections of the hose 16 and 17 leading from the casing 14 are coupled, respectively, to the brake-pipe 4 and signal-pipe 6, as shown in Fig. 1, to effect an operative communication between these two pipes of the system.

The detailed construction of the device contained within the casing 14 and fully shown in Fig. 2 is as follows: Within the casing 14 and communicating with the hose 16 is the passage 18, leading to the two branch passages 19 and 20, which unite in the common passage 21, communicating with the signal-pipe 6 by means of the hose 17 at the opposite end of the casing 14. An auxiliary passage 22 opens into the branch passage 19 and communicates with a passage in the hook 15, which is controlled by the stop-cock 23 in such passage. In the passage 19 is located an enlarged piston-chamber 24 for the operative reception of a piston 25, connected to a piston-rod 26, which extends through and beyond a perforated wall 27 in the passage and carries at its extreme end a valve 28 for opening and closing an exhaust-port 29 in the passage 19. This valve is held in tight sliding contact with the wall of the passage 19 by a spring 30. Upon the piston-rod 26, between the valve 28 and the piston-chamber 24, is rigidly secured an auxiliary piston 31. 39 indicates a spring coiled about the piston-rod 26 between the piston 25 and wall 27 and which tends to hold the pistons and valve in the position shown in Fig. 2. Extending down from the passage 19 is a chamber 32, in which operates a piston 33, between which and the lower end of the chamber 32 is a spring 34. Secured to the upper side of the piston 33 is a locking-rod 35, the upper end of which is beveled and extends into the passage 19 through a hole in the wall thereof, as shown. This rod 35 is movably seated in a socket in the upper side of the piston 33 and is held up by a spring 36, which permits it to be depressed independently of its piston. The hole in the wall of the passage 19 through which the locking-rod passes is but slightly larger than said rod, so that only a restricted opening is left for the passage of air to and from the chamber 32, which causes a tardy movement of the piston 33. In the bottom of the chamber 32 and in the passage 19, between the piston 31 and the wall 27 of the piston-chamber 24, are exhaust-openings 37 and 38, which allow the escape of air and prevent the formation of air-cushions in said chamber and passage. In the passage 20 is located an enlarged piston-chamber 40 for the operative reception of the piston 41, connected to a piston-rod 42. Upon the outer end of this piston-rod 42 is a valve 43 for opening and closing an exhaust-port 44 in the passage 20. This valve is held in tight sliding contact with the wall of the passage 20 by the spring 45. Upon the piston-rod 42, between the valve 43 and the piston-chamber 40, is fixed the auxiliary piston 46. 54 is a spring arranged between the piston 41 and right-hand end of the piston-chamber and tending to hold the pistons and valve in the position shown in Fig. 2, in which the exhaust-port 44 is closed. Extending down from the piston-chamber 40 is a chamber 48, in which operates a piston 49, between which and the lower end of the chamber 48 is the spring 50. The piston 49 carries a locking-rod 51, the upper end of which is beveled and extends into the passage 20 through a hole in the wall of said passage. This locking-rod 51 is movably seated in a socket in the piston 49 and is pressed upwardly by a spring 52, which permits of its automatic engagement and disengagement with the piston 41. In the bottom of the chamber 48 and in the passage 20, between the pistons 41 and 46, are escape-passages 53 and 47, which prevent the formation of air-cushions in said chamber and passage.

My improved device, connecting the engineer's-brake-valve handle and the signal-pipe, is arranged as follows, (see Figs. 1, 3, and 4:) 55 is a pipe the lower end of which communicates with the signal-pipe 8. Upon its upper end is mounted a casing 56, in which is arranged a pressure-reducer and a regulating-valve. The pressure-reducer consists of the cylindrical weight 57, adapted for vertical movement under pressure in the chamber 58 upon the guide-rod 59. This chamber has at its lower end the exhaust-opening 60. Below this pressure-reducer is located a cylindrical valve 61, seated in a cylindrical socket 62 at right angles to the passage 63 in the pipe 55. Diametrically across this valve is arranged a passage 64, adapted to form a continuation of the pipe-passage 63. One end of this valve-passage 64 is widened, as at 65, to throw the pipe-passage 63 in communication with the exhaust-opening 66. The valve 61 has an operating-lever 67 rigidly secured thereto, such lever 67 being connected to the engineer's-brake-valve handle 2 by a rod 68. The end of this rod 68 which is in engagement with the brake-valve handle is provided with the elongated slot 69, adapted for the sliding reception of the pin 70 on the brake-valve handle. When the brake-valve handle is turned to "lap" position, the passage 64 of the valve 61 is in proper position to allow the air from the signal-pipe to pass up into the weight-valve 57 58, which is set for a pressure of twenty pounds, the surplus pressure escaping through the exhaust-opening 60. The noise of this escaping air will serve as a warning to notify the engineer when he is not braking that his brake-valve handle is not in its proper position.

My improved connections between the signal-valve and the signal-pipe are arranged as follows: The signal-valve 7, which is shown in section in Fig. 5 and is of well-known construction, has the upper chamber 71 and the lower chamber 72, separated by the flexible diaphragm 73. Under my improved arrangement I place the lower chamber 72 of the valve in communication with the signal-pipe 8 by means of the pipe 11, which is provided with the controlling-valve 74, (shown in section in Fig. 6,) in which 75 is a chamber provided with the removable screw-threaded cap 76. Within this chamber is the cup-valve 77, resting upon its valve-seat 78 in the pipe 11. The spiral spring 79, seated in the cup-valve 77 and having its upper end in bearing contact with the cap 79, serves to normally hold such valve in close contact with its seat.

82 represents a valve located in the cab and controlling the signal-pipe 8 and having an operating-handle 80, by which the valve can be moved to open and close said pipe.

The operation of my improved apparatus just described in detail is as follows: After the necessary pressure has been obtained in both the brake and signal pipes 4 and 6 to prepare the system for effective service should the pressure be reduced below an effective point, either through the failure of the pump to maintain the proper pressure or from any accidental obstruction in the brake-pipe 4 without the knowledge of the engineer, the apparatus in the passage 19 (see Fig. 2) operates automatically as follows: The proper pressure for the brake-pipe through pipe 16 and passage 18 is usually seventy pounds to the square inch, which is exerted against the auxiliary piston 31, which serves, with the aid of the spring 39, to hold the piston 25 in the extreme right end of the chamber 24 against the pressure on the opposite side of the piston 25 coming from the signal-pipe 6 through pipe 17 and passage 21, usually forty-five pounds to the square inch, which acts on the opposite side of the larger piston 25, the exhaust-port being closed by the valve 28. Should the pressure in the brake-pipe now be reduced through accident, as before outlined, below the strength of the opposite pressure from the signal-pipe, the piston 25 will be forced to the opposite end of its chamber against the action of the spring 39 and will carry the valve 28 to the left and open the exhaust-port 29, thus leaving a vent for the escape of the air in the brake-pipe, which discharges into the casing 14 and from thence through opening 81 into the outside atmosphere, which has the effect of instantly setting the brakes by quick action. The locking-rod 35 is designed to hold the pistons and valve in the normal position shown prior to the establishment of the proper pressure in the brake and signal pipes. In case the air-pressure is admitted to the signal-pipe before its admission to the brake-pipe there will not be the requisite pressure in the chamber 32, which communicates with passage 19 on the brake-pipe side of the piston 31, to depress the locking-rod 35, and the latter will be held up by its piston and spring 34 and will block the movement of piston 31 and prevent the action of valve 28 until the air under pressure in chamber 32, which is admitted slowly past the locking-rod 35, depresses the piston 33 against the action of the spring 34, which causes the attached locking-rod to be drawn out of the way of the piston 31. After such piston has passed the locking-rod by reason of the reduced pressure in the brake-pipe, as above explained, the locking-rod is again thrown to its highest position. So long as the pressure in the brake-pipe and passage 19 is sufficient to hold the pistons 31 and 25 to the right, as shown, the locking-rod is held down out of the path of the piston 31 by the air-pressure, and as the locking-rod can only rise slowly, owing to the reduced escape-passage for the air from the chamber 32, sufficient time is allowed for the piston 31 to move past the locking-rod. When the brakes have been set by the automatic action of the apparatus just described and the trouble located and adjusted, it is necessary to release the brakes and permit the automatic apparatus just described to be returned to its normal position. This is accomplished in the following manner: The brake-valve handle 2 is thrown over to what is known as its "emergency" position. The connecting-rod simultaneously pulls the lever 67 and turns its attached valve into such a position that the enlarged end 65 of the valve-passage 64 (see Fig. 3) connects the passage 63 in pipe 55 and the exhaust-opening 66 adjacent thereto. This provides a vent through which the signal-pipe may be emptied to remove the pressure in passage 19 on the right-hand side of the piston 25 and permit the spring 39 to force the pistons 25 and 31 and the valve 28 back to their normal locked positions, as shown in Fig. 2. When the piston 31 returns to its normal position, it strikes the beveled upper end of the locking-rod 35 and forces it down in its socket in the piston 33 against the action of its spring 36 and without depressing the piston 33 in its chamber 32. After the passage of the piston 31 the rod 35 is returned to its locking position by its spring 36. The brakes may be released without any movement of the automatic device just described by simply turning the brake-valve handle to "release" position, which simultaneously turns the valve 61 64 through connecting-rod 68 and closes pipe 55, thus permitting the restoration of the normal pressure in the signal-pipe.

The described sliding connection of the rod 68 with the brake-valve handle 2 permits the valve 61 64 to remain open during service-braking and while the valve-handle is in lap position.

The valve 23 in the branch passage 22, which leads from the brake-pipe passage 19 to the hollow handle 15, which is open at the lower free end of the hook, is employed to bleed the brake-pipe 4 by hand at the rear end of the train in order to set the brakes without the assistance of the engineer when necessary.

In case anything happens to render it impossible for the engineer to set the brakes by means of the brake-valve 1 in the cab in the usual manner he can apply the brakes through the instrumentality of the hand-valve 82 in the signal-pipe 8 in the following manner: The pistons 41 and 46 in the passage 20 and the spring 54, acting therein, are so proportioned that with the normal brake-pipe pressure (seventy pounds, more or less) on the left from passage 18 and the signal-pipe pressure (forty-five pounds, more or less) on the right from the passage 21 the pistons are held in the normal position shown in Fig. 2, with the valve 43 closing the exhaust-port 44. When the occasion arises, as just explained, the engineer operates the lever 80 to open the attached valve 82 and discharge the air from the signal-pipe 8. This removes the pressure from the right-hand side of the piston 41, and the pressure from the brake-pipe 16 and passages 18 and 20 against the left-hand side of the smaller piston 46 forces piston 41 to the right against the action of the spring 54. The valve 43, attached to the pistons, is carried to the right and beyond the exhaust-port 44, through which the air from the brake-pipe escapes, thus setting the brakes in quick action.

The locking-rod 51 acts in a manner similar to the other locking-rod 35 and prevents the action of the pistons 46 41 and valve 43 by the pressure in the brake-pipe prior to supplying pressure to the signal-pipe. The locking-rod is normally held down out of the path of the piston 41 by the ordinary pressure in the passage 20 from the signal-pipe 8. After the pistons 41 46 have been operated by emptying the signal-pipe 8, as explained, the pressure is removed from the piston 49 of the locking-rod, and the latter rises to the position shown.

When it is necessary to release the brakes, the valve 82 is closed, which permits the normal pressure to be restored to the signal-pipe 8, pipe 17, and passage 21 20 against the right-hand side of piston 41. This serves to force the piston 41 back to its normal position and with it the valve 43 in closed position over the exhaust-port 44. In the absence of air-pressure the spring 54 will restore the piston 41 to its normal position. The pressure is then restored in the brake-pipe, which releases the brakes. The piston 41 in its travel to the left rides over the beveled upper end of the locking-rod 51, depressing it as it passes the same.

The valve 82, the operation of which has just been described, can also be used to determine whether all angle or stop cocks in the brake and signal pipes are open after all connections are made in the brake system before starting the train.

The signal-pipe can be emptied and the brakes set by putting the brake-valve handle 2 to the emergency position, which will cause valve 61 64 to open and empty signal-pipe 8, and thus set the brakes in the same manner as has just been described in connection with valve 82 and piston 41 and its attachments.

In setting the brakes in the usual manner through brake-valve 1 it is essential not to interfere with the effective working of the signal system and at the same time prevent the operation of the piston 25 and its attached valve 28, as has been before outlined. This is accomplished in the following manner, (see Figs. 1, 3, 5, and 6:) In the movement of the brake-valve handle 2 to set the brakes the pressure is reduced on the signal-pipe 8, say, to twenty pounds by the valve 61 64 being opened so that the air under pressure is permitted to pass through the same to the weight-valve 57 58, which holds the pressure at twenty pounds, as desired. When this pressure is reduced in the main signal-pipe 8, the pressure in the lower chamber 72 of the signal-valve 7 is reduced simultaneously through the connecting-pipe 11 and valve 74, which communicates with the signal-pipe 8, in order that the whistle will not be blown while the pressure is being reduced. This valve 74 is held closed up to twenty pounds pressure by the spring 79 acting on the cup-valve 77, which permits all pressure over twenty pounds to pass on to the signal-pipe 8, thus preventing the diaphragm 73 from being raised to open the whistle-valve 83 to operate the whistle during the ordinary setting of the brakes, as well as to insure the proper working of the signal-valve at all other times.

I claim as my invention—

1. In an air-brake mechanism involving separate brake and signal pipes, the combination with the brake and signal pipes, of a mechanism in communication with such pipes at the rear end only of the brake system, by means of which the braking impulse is automatically shifted from the brake-pipe to the signal-pipe, as and for the purpose stated.

2. In an air-brake mechanism involving separate brake and signal pipes, the combination with the brake and signal pipes, of a mechanism in communication with said pipes, and under the control of the engineer, by means of which the braking impulse is automatically shifted from the brake-pipe to the signal-pipe, and can also be shifted at will, substantially as set forth.

3. In an air-brake mechanism involving separate brake and signal pipes, the combination with the brake and signal pipes, of a mechanism in communication with said pipes and under the control of the engineer, by means of which the brakes can be applied at will by change of pressure in the signal-pipe, substantially as set forth.

4. In an air-brake mechanism involving separate brake and signal pipes, the combination with the brake and signal pipes, of a mechanism under the control of the engineer, by means of which the signal-pipe is automatically placed in communication with the brake-pipe to apply the brakes, upon a reduction of pressure in the brake-pipe, and whereby the brakes can be applied at will by a reduction of pressure in the signal-pipe, substantially as set forth.

5. In an air-brake mechanism involving separate brake and signal pipes, the combination with the brake and signal pipes, of a mechanism by means of which the pressure in the signal-pipe operates automatically upon a reduction of pressure in the brake-pipe to establish communication between the brake-pipe and the external atmosphere at the rear end only of the brake system, substantially as set forth.

6. In an air-brake mechanism involving separate brake and signal pipes, a mechanism in communication with such pipes, by means of which the braking impulse is automatically shifted from the brake-pipe to the signal-pipe, and means connected with the engineer's brake-valve and the signal-pipe for controlling the automatic shifting mechanism in setting the brakes from the brake-pipe, as and for the purpose stated.

7. In an air-brake mechanism involving separate brake and signal pipes, a mechanism in connection with such pipes, by means of which the braking impulse is automatically shifted from the brake-pipe to the signal-pipe, and means connected with the engineer's brake-valve and signal-pipe for releasing the brakes after they have been automatically set, as and for the purpose stated.

8. In an air-brake mechanism involving separate brake and signal pipes, a mechanism in communication with such pipes, by means of which the braking impulse is automatically shifted from the brake-pipe to the signal-pipe, and means connected with the engineer's brake-valve and the signal-pipe for controlling the automatic shifting mechanism in setting the brakes from the brake-pipe and for releasing the brakes after they have been automatically set, as and for the purpose stated.

9. In an air-brake mechanism involving separate brake and signal pipes, a mechanism in communication with such pipes, and a hand-valve located at the locomotive-cab and controlling the signal-pipe, by means of which the brake-pipe can be bled or emptied at the point of communication between the brake and signal pipes, for setting the brakes as and for the purpose stated.

10. In an air-brake mechanism involving separate brake and signal pipes, a mechanism in communication with such pipes, by means of which the braking impulse is automatically shifted from the brake-pipe to the signal-pipe, an engineer's brake-valve for operating the brakes, a signal device, and mechanism for preventing the operation of the signal device in setting the brakes by means of the brake-valve, substantially as set forth.

Witness my hand this 29th day of May, 1903.

THOMAS J. QUIRK.

Witnesses:
JNO. J. BONNER,
C. M. BENTLEY.